E. L. WEED.
CONNECTING RING.
APPLICATION FILED MAR. 12, 1921.
1,421,876.
Patented July 4, 1922.
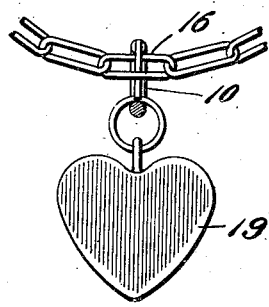
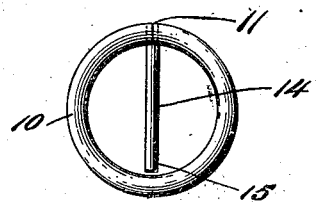
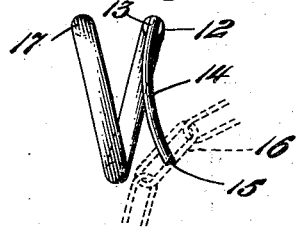
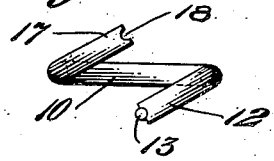
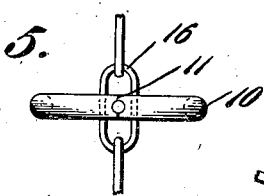
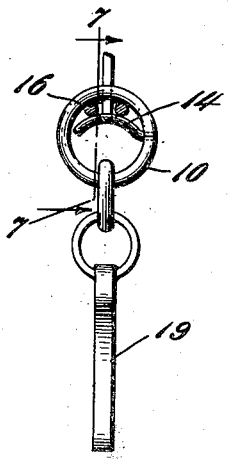
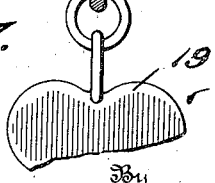
Inventor
Edward L. Weed
By
Howard E. Barlow
Attorney

UNITED STATES PATENT OFFICE.

EDWARD L. WEED, OF PROVIDENCE, RHODE ISLAND, ASSIGNOR TO POTTER & BUFFINTON COMPANY, OF PROVIDENCE, RHODE ISLAND, A CORPORATION OF RHODE ISLAND.

CONNECTING RING.

1,421,876.      Specification of Letters Patent.      Patented July 4, 1922.

Application filed March 12, 1921. Serial No. 451,852.

*To all whom it may concern:*

Be it known that I, EDWARD L. WEED, a citizen of the United States, residing at the city of Providence, in the county of Providence and State of Rhode Island, have invented certain new and useful Improvements in Connecting Rings, of which the following is a specfication.

This invention relates to improvements in the construction of so-called jump rings of the type used more particularly for connecting together the ends of chains, or attaching pendants, charms or the like to a chain; and the object of this invention is to provide in such a ring, a spur, bar or pin more particularly adapted to engage the chain link on which the ring is hung, which spur serves to engage the link and limit the longitudinal movement of the ring along the chain, this anchoring spur also serves, by passing through a link or wedging between two links of the chain, to prevent the ring from rotating on the supporting link and so effectually prevent the suspended locket or charm from rotating when so hung to expose its reverse or opposite side.

A further object of this invention is to connect the pin or spur to one end of the ring at the joint thereof the opposite end of the ring being grooved and adapted to snap over the body of the spur to serve as a detent to prevent the ring from being too readily opened at the joint.

With these and other objects in view the invention consists of certain novel features of construction, as will be more fully described, and particularly pointed out in the appended claims.

In the accompanying drawing:

Figure 1 is an elevation illustrating my improved ring as attached to the link of a chain.

Figure 2 is an enlarged side elevation of the ring closed, showing the spur therein.

Figure 3 is an edge view illustrating the joint ends, of the ring as separated laterally and the free end of the spur as bent off to one side to be passed through a chain link.

Figure 4 is an edge view of my improved ring at the joint, showing the joint ends as offset laterally one of the ends having the spur fixed thereto the other end being grooved to snap over the body of the spur and so lock the ends together when in alinement.

Figure 5 is an edge view of the ring with the joint ends in alinement and the spur passing through a chain link.

Figure 6 is a modification illustrating a construction in which the spur instead of passing through a link, is offset to engage and bind the link against the inner surface of the ring to limit the movement of the ring both circularly and longitudinally on the link.

Figure 7 is a section on line 7—7 of Figure 6.

An ordinary jump ring is used principally for connecting lockets or other pendants to chains, or for similar uses and comprises essentially a simple ring split to form a joint and adapted to be offset laterally to receive the members to which it is to be attached, but when a strain is brought to bear upon the old style jump ring it spreads and opens and the pendant supported thereby is lost; then again an ordinary jump ring of this character may slip along from one link of the chain to another and is never held in any fixed position on the chain, and third, the ring is so loosely held on the chain link that it may rotate or swing bodily sufficiently to permit the supported pendant to turn over and so expose its reverse side which is objectionable particularly where the pendant is not provided with a double face, and the following is a detailed description of one improved form of jump ring whereby the above difficulties are obviated.

With reference to the drawing, 10 designates a jump ring of my improved character which is split at 11 the end 12 being grooved as at 13 and a pin, spur or bar 14 is set into this groove 13, substantially one-half its diameter, and soldered or otherwise secured thereto. This pin extends inwardly preferably across the center opening of the ring and its free end 15 is adapted to be bent downwardly as illustrated in Figure 3 to permit it to be passed through the link 16 of the chain to which the ring is to be attached after which this pin or spur may be bent back in line with the ring wire.

The opposite end 17 of this ring is also grooved as at 18 so that when the ends are twisted back into alinement with each other the projecting portion of the spur on the end 12 will snap into the groove 18 in the end 17 thereby securely locking these ends against being inadvertently spread apart or opened by any working strain may be brought against them.

In some instances where it is found that the spur is too large to pass through the link which is sometimes the case where the chain links are short and very closely coupled together. I offset this spur as illustrated in Figure 6, causing it to bind the link against the inner surface of the ring wire in which case it performs substantially the same function as though the spur were passed through the link, that is, it limits the movement of the ring upon the link both lengthwise and also against bodily rotation thereon and in this way the pendant 19 is effectually prevented from rotating sufficiently to present its reverse side to the front without twisting the chain.

Then again by the use of my spur in the jump ring if for any reason this ring should by some unusual strain be opened it would not be released readily from the chain and the pendant lost.

In some instances as illustrated in Figure 1, the spur passes through the link while in another instance as illustrated in Figure 6, the spurs bind the link to the ring.

I do not wish to be restricted to the use of my improved spur to a jump ring as the device may be applied to any kind of a ring used in connecting together articles of jewelry or the like.

The device is very simple and inexpensive in construction and effective in its operation and by its use the troubles of jump rings are obviated.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A ring of the character described having an internally-extending spur or bar for engaging the chain-link on which the ring is hung to limit the movement of the link thereon, the plane of said bar being normally in line with that of said ring.

2. A ring of the character described having a spur with one end connected to one end of the ring at the joint to extend inwardly therefrom the opposite end of the ring being grooved to snap over the body of the spur to serve as a detent for the ring ends against too readily opening at the joint.

In testimony whereof I affix my signature.

EDWARD L. WEED.